United States Patent
Yoon et al.

(10) Patent No.: US 9,359,528 B2
(45) Date of Patent: Jun. 7, 2016

(54) PRESSURE SENSITIVE ADHESIVE COMPOSITION

(75) Inventors: Sung Soo Yoon, Daejeon (KR); No Ma Kim, Daejeon (KR); In Ho Hwang, Daejeon (KR); In Kyu Park, Daejeon (KR); Min Ki Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/580,893

(22) PCT Filed: Feb. 28, 2011

(86) PCT No.: PCT/KR2011/001406
§ 371 (c)(1),
(2), (4) Date: Aug. 23, 2012

(87) PCT Pub. No.: WO2011/105878
PCT Pub. Date: Sep. 1, 2011

(65) Prior Publication Data
US 2012/0328800 A1  Dec. 27, 2012

(30) Foreign Application Priority Data

Feb. 26, 2010 (KR) .......... 10-2010-0017661
Feb. 28, 2011 (KR) .......... 10-2011-0018060

(51) Int. Cl.
*C09J 133/08* (2006.01)
*C09J 7/00* (2006.01)
(Continued)

(52) U.S. Cl.
CPC .......... *C09J 7/00* (2013.01); *C09J 133/062* (2013.01); *B32B 2457/202* (2013.01);
(Continued)

(58) Field of Classification Search
CPC .... C09J 2433/00; C09J 133/00; C09J 133/08; C09J 133/10; C09J 133/12; C09J 201/00; C09J 201/02; C09J 201/10; C09J 2201/00; C09J 2201/02; C09J 7/00; C09J 133/062; C09J 2201/134; C09J 2203/318; G02F 1/133345; G02F 2001/1533; G02F 2001/1536; B32B 17/10743; B32B 27/00; B32B 27/04; B32B 27/06; B32B 27/08; B32B 27/16; B32B 7/12; B32B 2457/202; G02B 5/3083; Y10T 428/1059; Y10T 428/1082; Y10T 428/2809; Y10T 428/24942
USPC ........... 156/106, 247; 349/96–103, 122–138, 349/350, 361; 427/207.1, 208, 208.4, 427/208.6, 208.8, 457, 532, 553, 557, 558, 427/487, 493, 508, 510, 517; 428/1.1, 1.3, 428/1.5, 355 R, 355 EN, 355 BL, 355 AC, 428/356; 524/236, 356, 555, 556; 525/329.9, 330.5; 526/931
See application file for complete search history.

(56) References Cited

U.S. PATENT DOCUMENTS 4,528,261 A * 7/1985 Hauser .................... 430/322
5,827,609 A * 10/1998 Ercillo et al. ............ 428/354
(Continued)

FOREIGN PATENT DOCUMENTS

CN  101074349 A  11/2007
EP  2223983 A2  9/2010
(Continued)

OTHER PUBLICATIONS

Scherzer et al., UV Curing of pressure sensitive adheisves studied by real-time FTIR-ATR spectroscopy, 2002, Vibrational Spectroscopy, 29, pp. 125-131.*

*Primary Examiner* — Gwendolyn Blackwell
*Assistant Examiner* — Eli D Strah
(74) *Attorney, Agent, or Firm* — Dentons US LLP (57) ABSTRACT

The present invention relates to a pressure sensitive adhesive composition. The present invention may effectively provide a pressure sensitive adhesive where peel forces for both sides are different and an modulus differs along the thickness direction. By applying the pressure sensitive adhesive as above, the present invention may provide, for example, an optical element, such as a polarizing plate, which can effectively inhibit light leakage and shows excellent durability, while being formed to have a thin thickness as well.

11 Claims, 1 Drawing Sheet

(51) Int. Cl.
*C09J 133/06* (2006.01)
*G02B 5/30* (2006.01)

(52) U.S. Cl.
CPC ..... *C09J 2201/134* (2013.01); *C09J 2203/318* (2013.01); *C09J 2433/00* (2013.01); *G02B 5/3083* (2013.01); *Y10T 428/1059* (2015.01); *Y10T 428/1077* (2015.01); *Y10T 428/1082* (2015.01); *Y10T 428/24942* (2015.01); *Y10T 428/2809* (2015.01)

(56) References Cited

U.S. PATENT DOCUMENTS

| | | | |
|---|---|---|---|
| 2004/0191509 A1* | 9/2004 | Kishioka et al. | 428/354 |
| 2004/0242770 A1 | 12/2004 | Feldstein et al. | |
| 2006/0162857 A1* | 7/2006 | Nagamoto et al. | 156/272.8 |
| 2007/0267133 A1* | 11/2007 | Matano | C09J 7/02 156/272.2 |
| 2008/0220251 A1* | 9/2008 | Takaki | 428/345 |
| 2010/0304104 A1* | 12/2010 | Nagasaki et al. | 428/213 |
| 2011/0007244 A1* | 1/2011 | Kim et al. | 349/96 |
| 2011/0149211 A1* | 6/2011 | Ha et al. | 349/96 |

FOREIGN PATENT DOCUMENTS

| | | | | |
|---|---|---|---|---|
| EP | 2230287 | A2 | 9/2010 | |
| JP | 8-155781 | | 6/1996 | |
| JP | 10-279901 | A | 10/1998 | |
| JP | 2002-014226 | | 1/2002 | |
| JP | 2005-243950 | | 9/2005 | |
| JP | 2006-512442 | A | 4/2006 | |
| JP | 2006-299053 | | 11/2006 | |
| JP | 2009-035615 | A | 2/2009 | |
| JP | 2010-44211 | | 2/2010 | |
| JP | 2011-105858 | A | 6/2011 | |
| KR | 10-2001-0093274 | A | 10/2001 | |
| TW | 200426440 | | 12/2004 | |
| TW | 200942592 | | 10/2009 | |
| TW | 200948916 | | 12/2009 | |
| WO | 2004-060946 | A1 | 7/2004 | |
| WO | WO 2008005782 | A2 * | 1/2008 | C09J 7/00 |
| WO | WO 2009069485 | A1 * | 6/2009 | B32B 25/08 |
| WO | 2009/088205 | | 7/2009 | |
| WO | WO 2009088205 | A2 * | 7/2009 | G02B 1/11 |
| WO | WO 2010021505 | A2 * | 2/2010 | C09J 133/08 |

* cited by examiner

PRESSURE SENSITIVE ADHESIVE COMPOSITION

This application is a National Stage Entry of International Application No. PCT/KR2011/001406, filed Feb. 28, 2011, and claims the benefit of Korean Application Nos. 10-2010-0017661, filed on Feb. 26, 2010, and 10-2011-0018060, filed on Feb. 28, 2011, which are hereby incorporated by reference in their entirety for all purposes as if fully set forth herein.

TECHNICAL FIELD

The present invention relates to a pressure sensitive adhesive composition, a pressure sensitive adhesive, a process for preparing the pressure sensitive adhesive, a polarizing plate and a liquid crystal display device.

BACKGROUND ART

A liquid crystal display device (LCD) may include various optical elements such as a polarizer, a retardation plate, an optical compensation film, a reflective sheet and a brightness enhancing film.

For example, the liquid crystal display device may comprise a liquid crystal panel and a polarizing plate attached to said panel. The polarizing plate may comprise, for example, a polarizer comprising an iodine compound or a dichroic dye arranged in a given direction, and a protective film attached to both sides of said polarizer, and comprise a pressure sensitive adhesive layer, which is formed on bottom of said protective film to attach the polarizing plate to the liquid crystal panel.

For the polarizing plate with the basic structure, Patent Reference No. 1 discloses a polarizing plate that a protective film, a polarizer, a pressure sensitive adhesive layer and an optical film are sequentially formed thereon. Patent Reference No. 1 is intended to provide a thin and light polarizing plate by removing one film of protective films formed on both sides of the conventional polarizer.

However, the polarizer is usually prepared by a hydrophilic polymer such as polyvinyl alcohol, vulnerable to water or moisture, and characteristically easily contracted, when a stretching process is carried out during the preparation processes. Therefore, if the protective film is simply removed as in Patent Reference No. 1, performance of the polarizing plate is highly deteriorated.

PRIOR ART REFERENCES

Patent References

[Patent Reference No. 1] JP Publication of Patent application No. 2002-014226

DISCLOSURE

Technical Problem

The present invention is intended to provide a pressure sensitive adhesive composition, a pressure sensitive adhesive, a process for preparing the pressure sensitive adhesive, a polarizing plate and a liquid crystal display device.

Technical Solution

The present invention relates to a pressure sensitive adhesive composition comprising an acrylic polymer with an alkyleneoxide group and an ultraviolet absorber, wherein the composition in a hardened state comprises an interpenetrating polymer network structure (hereinafter, optionally referred to as "IPN") comprising said acrylic polymer in a crosslinked state, and represents different peel forces in both sides of a sheet shape, on hardening the composition into the sheet shape.

The present pressure sensitive adhesive composition is explained in more detail.

In one aspect, said pressure sensitive adhesive composition may be a pressure sensitive adhesive composition for optical elements such as the polarizing plate, and specifically a pressure sensitive adhesive composition used to attach the polarizing plate to a liquid crystal panel.

In addition, said sheet shape may be a single-layered sheet shape, wherein the single layer means a case where only one layer is laminated.

The present pressure sensitive adhesive composition comprises an acrylic polymer having an alkyleneoxide group, wherein following hardening, it comprises an IPN structure comprising a cross-linked structure of which said acrylic polymer is cross-linked and formed, and another cross-linked structure other than said cross-linked structure. In one aspect, said alkyleneoxide group may be a straight, branched or cyclic alkyleneoxide having 1 to 20 carbon atoms, 1 to 16 carbon atoms, 1 to 12 carbon atoms, 1 to 8 carbon atoms or 1 to 4 carbon atoms. Such an alkyleneoxide group enables the pressure sensitive adhesive layer to have low haze, and for light leakage to be effectively inhibited when applied to optical elements such as the polarizing plate. In addition, said alkyleneoxide group enables a peel force to be maintained at a suitable level even in a state where an modulus in the pressure sensitive adhesive layer is increased.

The term, "IPN structure," means a state that at least two crosslinked structures are simultaneously present in the pressure sensitive adhesive composition after hardening, wherein one crosslinked structure of said at least two crosslinked structures comprises said acrylic polymer in a crosslinked state. In one aspect, said at least two crosslinked structures may be present in a state that each other is entangled, linked or penetrated. Said acrylic polymer may be included, for example, in a state crosslinked with a multifunctional crosslinker, in the IPN structure, wherein this crosslinking may be formed, for example, by formulating a multifunctional crosslinker to be capable of crosslinking said polymer in the composition and carrying out an appropriate treatment capable of polymerizing the polymer with said crosslinker during a hardening procedure.

In the above, the term, "hardening of the pressure sensitive adhesive composition," means a process where physical action or chemical reaction in the pressure sensitive adhesive composition occurs by irradiating it with light, maintaining it at a certain temperature or applying moisture thereto, and thus the composition develops adhesive properties. The hardened pressure sensitive adhesive composition herein may be optionally used to have the same meaning as a pressure sensitive adhesive or a pressure sensitive adhesive layer.

Said pressure sensitive adhesive composition is effective for use in forming a pressure sensitive adhesive layer that after hardening the composition into a sheet shape, both sides of the sheet show different peel forces, and this pressure sensitive adhesive layer may be effectively applied to, for example, the constitution of a polarizing plate without at least one protective film which is formed on both sides of a polarizer when constructing the polarizing plate.

In one aspect, said acrylic polymer may have a weight average molecular weight of 400,000 to 2,000,000. Said weight average molecular weight means a value of converting into standard polystyrene as measured by GPC (gel permeation chromatography), and more specifically, means a value measured by a method represented in the Examples below. The term, a molecular weight, herein means a weight average molecular weight, unless specified otherwise. By controlling the molecular weight of the polymer in said range, the present invention may provide a pressure sensitive adhesive composition having excellent durability under high temperature or high humidity conditions and workability such as coating properties.

In one aspect, said polymer may comprise a (meth)acrylic acid ester monomer, a monomer represented by the following chemical formula 1 and a crosslinkable monomer, as polymerized units.

[Chemical Formula 1]

wherein, R represents hydrogen or an alkyl group, A represents alkylene, $R_1$ represents an alkyl group or an aryl group, and n represents a number from 1 to 6.

As the (meth)acrylic acid ester monomer, for example, alkyl(meth)acrylate may be used, and considering control of cohesive force, glass transition temperature and adhesion properties, alkyl(meth)acrylate having an alkyl group with 1 to 14 carbon atoms may be used. An example of such a monomer may include methyl (meth)acrylate, ethyl(meth)acrylate, n-propyl(meth)acrylate, isopropyl (meth)acrylate, n-butyl(meth)acrylate, t-butyl(meth)acrylate, sec-butyl (meth)acrylate, pentyl(meth)acrylate, 2-ethylhexyl(meth) acrylate, 2-ethylbutyl (meth)acrylate, n-octyl(meth)acrylate, isooctyl(meth)acrylate, isononyl (meth)acrylate, lauryl (meth)acrylate and tetradecyl(meth)acrylate, and the like, one or at least two of which may be contained in the polymer.

Said monomer of chemical formula 1 provides the polymer with an alkyleneoxide group.

In said chemical formula 1, R may be, preferably, hydrogen or an alkyl group with 1 to 4 carbon atoms, and more preferably, hydrogen or a methyl group.

In said chemical formula 1, A may be also a substituted or unsubstituted alkylene group with 1 to 20 carbon atoms, 1 to 16 carbon atoms, 1 to 12 carbon atoms, 1 to 8 carbon atoms, or 1 to 4 carbon atom, where such an alkylene group may have a straight, branched or cyclic structure.

When $R_1$ in said chemical formula 1 is an alkyl group, said alkyl group may be also a substituted or unsubstituted alkyl group with 1 to 20 carbon atoms, 1 to 16 carbon atoms, 1 to 12 carbon atoms, 1 to 8 carbon atoms or 1 to 4 carbon atoms, where such an alkyl group may have a straight, branched or cyclic structure.

When $R_1$ in said chemical formula 1 is an aryl group, said aryl group may be also an aryl group with 6 to 20 carbon atoms, 6 to 16 carbon atoms or 6 to 12 carbon atoms.

In said chemical formula 1, n may be preferably 1 to 25, more preferably 1 to 15 and still more preferably 1 to 6.

A specific example of said monomer of chemical formula 1 may include alkoxy alkyleneglycol(meth)acrylic acid ester, alkoxy dialkyleneglycol(meth)acrylic acid ester, alkoxy trialkyleneglycol(meth)acrylic acid ester, alkoxy tetraalkyleneglycol(meth)acrylic acid ester, alkoxy polyethyleneglycol (meth)acrylic acid ester, phenoxy alkyleneglycol(meth) acrylic acid ester, phenoxy dialkyleneglycol (meth)acrylic acid ester, phenoxy trialkyleneglycol(meth)acrylic acid ester, phenoxy tetraalkyleneglyco 1 (meth)acrylic acid ester or phenoxy polyalkyleneglycol (meth)acrylic acid ester, and the like, one or at least two of which may be contained in the polymer.

The crosslinkable monomer may be used without specific limitation, as long as it may be copolymerized with said (meth)acrylic acid ester monomer and a monomer of chemical formula 1 by simultaneously containing a co-polymerizable functional group and a crosslinkable functional group in a molecule and provides the polymer with said crosslinkable functional group after co-polymerization.

An example of said crosslinkable functional group may include a hydroxyl group, a carboxyl group, a nitrogen-containing group such as an amino group, an isocyanate group or an epoxy group, and the like. In this field, various crosslinkable monomers that can provide the above crosslinkable functional groups are known, and all these monomers may be used herein. The crosslinkable monomer may include, for example, 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl (meth)acrylate, 2-hydroxyethyleneglycol(meth)acrylate, 2-hydroxypropyleneglycol (meth)acrylate, (meth)acrylic acid, 2-(meth)acryloyloxy acetic acid, 3-(meth)acryloyloxy propionic acid, 4-(meth)acryloyloxy butyric acid, acrylic acid dimer, itaconic acid, maleic acid, maleic acid anhydride, (meth)acrylamide, N-vinyl pyrrolidone or N-vinyl caprolactam, and the like, but is not limited thereto. One or at least two of such a crosslinkable monomer can be included in said polymer.

Said acrylic polymer may comprise, for example, 40 to 99.9 parts by weight of a (meth)acrylic acid ester monomer; 10 to 50 parts by weight of a monomer of chemical formula 1 and 0.01 to 30 parts by weight of a crosslinkable monomer. The term, "part by weight," herein means "ratio by weight" unless specified otherwise.

By controlling the ratio by weight of the acrylic polymer in the above range, the present invention may provide a pressure sensitive adhesive having excellent durability and optical properties, and the like.

Said acrylic polymer may further comprise an appropriate co-monomer in addition to the aforementioned monomers, for example, a co-monomer represented by the following chemical formula 2, in view of controlling glass transition temperature or providing other functionality.

[Chemical Formula 2]

wherein, $R_1$ to $R_3$ represent each independently hydrogen or alkyl, $R_4$ represents cyano; phenyl unsubstituted or substituted with alkyl; acetyloxy; or $COR_5$, where $R_5$ represents amino or glycidyloxy unsubstituted or substituted with alkyl or alkoxyalkyl.

In definitions of $R_1$ to $R_5$ in said chemical formula 2, alkyl or alkoxy means alkyl or alkoxy with 1 to 8 carbon atoms, and preferably, may be methyl, ethyl, methoxy, ethoxy, propoxy or butoxy.

A specific example of said monomer of chemical formula 2 may include one or at least two of a nitrogen-containing monomer such as (meth)acrylonitrile, (meth)acrylamide, N-methyl(meth)acrylamide or N-butoxymethyl(meth)acrylamide; a styrene monomer such as styrene or methyl styrene; glycidyl(meth)acrylate; or carboxylic acid vinyl ester such as vinyl acetate, and the like, but is not limited thereto.

When the acrylic polymer comprises said monomer of chemical formula 2, its ratio is preferably 20 parts by weight or less.

The acrylic polymer as above may be prepared by known usual polymerization methods in this field. For example, it may be prepared by appropriately formulating a (meth) acrylic acid ester monomer, a crosslinkable monomer and/or a monomer of chemical formula 1, and the like, as mentioned above, according to the desired ratios by weight to prepare a monomeric mixture, which is applied to a usual polymerization methods such as solution polymerization, photo polymerization, bulk polymerization, suspension polymerization or emulsion polymerization. In this procedure, if necessary, a suitable polymerization initiator or chain transfer agent, and the like may be used together.

Said pressure sensitive adhesive composition may further comprise a multi-functional crosslinker, which can be reacted with said acrylic polymer to embody a crosslinked structure in a hardening procedure.

As the multi-functional crosslinker, for example, a suitable kind of known crosslinkers such as an isocyanate crosslinker, an epoxy crosslinker, an aziridine crosslinker and a metal chelate crosslinker may be used, considering the crosslinkable functional group included in said acrylic polymer. An example of said isocyanate crosslinker may include a compound having at least two isocyanate groups such as tolylene diisocyanate, xylene diisocyanate, diphenylmethane diisocyanate, hexamethylene diisocyanate, isophoron diisocyanate, tetramethylxylene diisocyanate or naphthalene diisocyanate, or a crosslinker obtained by reacting the above compound having at least two isocyanate groups with a polyol, wherein the polyol may include, for example, trimethylol propane, and the like. In addition, the epoxy crosslinker may include ethyleneglycol diglycidylether, triglycidylether, trimethylol propane triglycidylether, N,N,N',N'-tetraglycidyl ethylenediamine and/or glycerine diglycidylether, and an example of the aziridine crosslinker may include N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and/or tri-1-aziridinylphosphineoxide, but is not limited thereto. An example of the metal chelate crosslinker may include a compound that a multivalent metal such as aluminum, iron, zinc, tin, titanium, antimony, magnesium or vanadium is coordinated to alkyl ester of acetyl acetone or acetoacetic acid, and the like, but is not limited thereto.

Said pressure sensitive adhesive composition or IPN structure may comprise said crosslinker in an amount of 0.01 to 10 parts by weight, more preferably 0.01 to 5 parts by weight, relative to 100 parts by weight of said acrylic polymer. Cohesive force and durability of the pressure sensitive adhesive may be excellently maintained in this range.

Said pressure sensitive adhesive composition may further comprise a photopolymerizable compound as a component for embodying other kinds of crosslinked structures than the crosslinked structure embodied by crosslinking said acrylic polymer. That is, said IPN structure may further comprise the crosslinked structure comprising the polymerized photopolymerizable compound. Such a crosslinked structure may be embodied by formulating the photopolymerizable compound to the pressure sensitive adhesive composition and polymerizing said photopolymerizable compound via light irradiation in a procedure of hardening the composition. The term, "a photopolymerizable compound," means a compound containing at least two photopolymerizable functional groups in the molecular structure, whereby it may be polymerized via light irradiation to embody a crosslinked structure. In addition, said photopolymerizable functional group is a functional group, which can be polymerized, or crosslinked by light irradiation, and its example may include a functional group comprising an ethylenic unsaturated double bond such as an acryloyl group or a methacryloyl group, but is not limited thereto. In addition, the term, "light irradiation," means irradiation with electromagnetic waves, wherein an example of said electromagnetic wave may include microwaves, infrared (IR), ultraviolet (UV), X-ray and γ-ray, or a particle beam such as α-particle beam, proton beam, neutron beam and electron beam.

As said photopolymerizable compound, for example, a multi-functional acrylate (MFA) may be used.

An example of the multifunctional acrylate may include a difunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone modified dicyclopentenyl di(meth)acrylate, ethyleneoxide modified di(meth)acrylate, di(meth) acryloxy ethyl isocyanulate, allylated cyclohexyl di(meth)acrylate, tricyclodecanedimethanol(meth)acrylate, dimethylol dicyclopentane di(meth)acrylate, ethyleneoxide modified hexahydrophthalic acid di(meth)acrylate, tricyclodecane dimethanol(meth)acrylate, neopentylglycol modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide modified trimethylolpropane tri(meth)acrylate, 3-functional urethane (meth)acrylate or tris(meth)acryloxy ethylisocyanulate; a tetrafunctional acrylate such as diglycerine tetra(meth)acrylate or pentaerythritol tetra(meth)acrylate; a pentafunctional acrylate such as propionic acid modified dipentaerythritol penta(meth)acrylate; and a hexafunctional acrylate such as dipentaerythritol hexa(meth)acrylate, caprolactone modified dipentaerythritol hexa(meth)acrylate or urethane(meth)acrylate (ex. a reactant of an isocyanate monomer and tri methylolpropane tri(meth)acrylate), one or at least two of which may be used alone or in combination thereof, but is not limited thereto.

It is preferred in view of durability herein especially to use an acrylate having a molecular weight of less than 1,000 and at least trifunctionality, that is, at least 3 (meth)acryloyl groups, but is not limited thereto.

In addition, it is preferred to use an acrylate comprising a cyclic structure and/or urethane bond in a molecular structure as a multifunctional acrylate. In this case, the cyclic structure included in the acrylate is any structure of a carbocyclic or heterocyclic structure; or a monocyclic or polycyclic structure. In particular, an example of the cyclic structure included in said multifunctional acrylate may include a cycloalkyl cyclic structure having 3 to 12 carbon atoms, preferably 3 to 8 carbon atoms, such as cyclopentane, cyclohexane or cycloheptane, at least one, preferably 1 to 5, and more preferably 1 to 3 of which may be included in the acrylate, and at least one heteroatom such as O, S or N may be also included therein.

A specific example of a multifunctional acrylate comprising a cyclic structure and/or urethane bond as above may include a monomer having an isocyanulate structure such as tris(meth)acryloxy ethyl isocyanulate or urethane acrylate (ex. a reactant of an isocyanate compound having a cyclic structure in the molecule, for example, isophorone disocyante, and an acrylate compound such as trimethylolpropane tri(meth)acrylate or pentaerythritol tri(meth)acrylate, and the like), and the like, but is not limited thereto.

The photopolymerizable compound in said pressure sensitive adhesive composition or IPN structure may be contained in an amount of 20 to 200 parts by weight, preferably 50 to 200 parts by weight, and more preferably 60 to 150 parts by weight, relative to 100 parts by weight of said acrylic polymer, whereby the present invention may provide a pressure sensitive adhesive such that the appropriate IPN structure is embodied and the modulus and peel force are maintained in a desired level.

Said pressure sensitive adhesive composition comprises an ultraviolet absorber, which plays an important role in forming the aforementioned sheet shape pressure sensitive adhesive with different peel forces in both sides.

That is, when the pressure sensitive adhesive composition comprises said photopolymerizable compound to form a pressure sensitive adhesive with the IPN structure, light irradiation, for example, ultraviolet irradiation, is required for hardening of said composition. For example, if the pressure sensitive adhesive composition is coated to a predetermined thickness to be subjected to irradiation with ultraviolet on one side of the coating layer, for forming the sheet shape pressure sensitive adhesive; the side of the coating layer irradiated with said ultraviolet is sufficiently hardened to show high modulus, but said ultraviolet is absorbed in the coating layer by an ultraviolet absorber present therein, as ultraviolet proceeds along a thickness direction to the bottom part of the coating layer. Therefore, the lower the ultraviolet is down from the irradiated side of the coating layer to the bottom part along a thickness direction, the less the amount of arrived ultraviolet becomes, and the down-most part of the coating layer has the least arrived amount of ultraviolet, so that the least degree of hardening is obtained. As a result, the sheet shape coating layer has a gradient of modulus that modulus is changed along the thickness direction. The above modulus means a tensile modulus or a storage modulus. If the modulus in the sheet shape pressure sensitive adhesive layer differs along the thickness direction as above, the side having high modulus, that is, the side of coating layer irradiated with ultraviolet on hardening, shows a low peel force, while the opposite side may show a high peel force.

The ultraviolet absorber may be used without any specific limitation, as long as it does not inhibit optical properties, modulus, re-detachability, workability or peel force, and the like, of the pressure sensitive adhesive layer.

The ultraviolet absorber includes, benzotriazole compounds such as 2-(2'-hydroxyphenyl)-benzotriazole-based compounds, for example, 2-(2'-hydroxy-5'-methylphenyl) benzotriazole, 2-(3',5'-di-tert-butyl-2'-hydroxyphenyl)benzotriazole, 2-(5'-tert-butyl-2'-hydroxyphenyl)benzotriazole, 2-(2-hydroxy-5-(1,1,3,3,tetramethylbutyl)phenyl)benzotriazole, 2-(3',5'-di-tert-butyl-2'-hydroxyphenyl)-5-benzotriazole, 2-(3'-tert-butyl-2'-hydroxyphenyl-5'-methylphenyl)-5-benzotriazole, 2-(3'-sec-butyl-5'-tert-butyl-2'-hydroxyphenyl)benzotriazole, 2-(2'-hydroxy-4'-octyloxyphenylphenyl)-5-benzotriazole or 2-(3',5'-di-tert-butyl-2'-hydroxyphenyl)benzotriazole, and the like; benzophenone compounds such as 2-hydroxy benzophenone-based compounds having 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy functional groups; benzoic acid ester compounds such as a compound having a substituted benzoic acid ester structure, for example, 4-tert-butyl-phenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl-3,5'-di-tert-butyl-4-hydroxybenzoate, hexadecyl 3,5-di-tert-butyl-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate, and the like; triazine compounds, and the like, but is not limited thereto.

Said ultraviolet absorber in the pressure sensitive adhesive composition may be included in an amount of 0.1 to 10 parts by weight, relative to 100 parts by weight of said photopolymerizable compound, but is not limited thereto. The amount of said ultraviolet absorber may be changed, considering the degree of hardening the pressure sensitive adhesive composition or the desired modulus or peel force characteristics.

The pressure sensitive adhesive composition may further comprise a radical initiator such that the polymerization of said photopolymerizable compound may be effectively induced. In one aspect, said radical initiator may be a photoinitiator, the specific kind of which may be appropriately selected, considering hardening rate and yellowing probability. For example, benzoin-based, hydroxy ketone-based, amino ketone-based or phosphine oxide-based photoinitiators, and the like may be used, and specifically, include benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] and 2,4,6-trimethylbenzoyl-diphenyl-phosphineoxide, and the like. Here, one or two or more of the foregoing may be used.

The pressure sensitive adhesive composition may comprise 0.2 to 20 parts by weight of said photoinitiator, relative to 100 parts by weight of the photopolymerizable compound. By controlling the amount of photoinitiator, an effective hardening reaction may be induced, the degree of hardening may be maintained in an appropriate level, and storage property of the composition may be secured.

Also, the pressure sensitive adhesive composition may further comprise a silane coupling agent. Such a coupling agent may develop heat resistance and humidity resistance, and the like, in the pressure sensitive adhesive. In addition, said coupling agent can act on enhancing adhesion reliability, when the pressure sensitive adhesive is held under high temperature or high humidity conditions for a long time. An example of the coupling agent that can be used herein may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanato propyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyaceto trimethoxy silane, one or at least two of which may be used alone or in combination thereof. Here, it is preferred to use a silane coupling agent having an acetoacetate group or a β-cyanoacetyl group, which is not limited thereto. The silane coupling agent in the pressure sensitive adhesive composition may be included in an amount of 0.01 to 5 parts by weight, preferably 0.01 to 1 part by weight, relative to 100 parts by weight of the acrylic polymer. If the content of the coupling agent is less than 0.01 parts by weight, it is apprehended that the increased effect of adhesion strength will be slight. If it is in excess of 5 parts by weight, it is apprehended that durability will be lowered.

In view of controlling adhesion performance, the pressure sensitive adhesive composition may further comprise a tackifying resin. Such a tackifier is not particularly limited to any kind and, for example, one or at least two, in combination thereof, of a hydrocarbon resin, a rosin resin, a rosin ester resin, a terpene resin, a terpene phenol resin, a polymerized rosin resin, a polymerized rosin ester resin, or hydrogenated products thereof may be used. Said tackifying resin may be included in an amount of 1 to 100 parts by weight, relative to 100 parts by weight of the acrylic polymer, whereby the effect enhancing compatibility and/or cohesive force may be excellently maintained.

The pressure sensitive adhesive composition may further comprise at least one additive selected from the group consisting of an epoxy resin, a crosslinker, an ultraviolet light stabilizer, an antioxidant, a colorant, a reinforcing agent, a filler, a antifoaming agent, a surfactant and a plasticizer in a range not affecting the effect of the invention.

The present invention also relates to a pressure sensitive adhesive comprising an acrylic polymer having an alkyleneoxide group and an ultraviolet absorber, wherein said acrylic polymer in a crosslinked structure is included in an interpenetrating polymer network structure, and being in a sheet shape having a first surface and a second surface present opposite to said first surface, wherein said first surface and second surface have different peel forces.

Said pressure sensitive adhesive layer may be formed by hardening the aforementioned pressure sensitive adhesive composition according to the present invention in a manner described below. Therefore, individual components or amounts, and the like, included in said pressure sensitive adhesive layer are the same as descriptions of said pressure sensitive adhesive composition.

Said pressure sensitive adhesive has a sheet shape, both sides of which have different peel forces. The above surface of the first surface and the second surface is a term for defining a direction of the pressure sensitive adhesive surface in the sheet shape pressure sensitive adhesive, wherein when any one surface in the sheet shape pressure sensitive adhesive is optionally designated, for example, as the first surface, the surface located on the side opposite to the first surface may be designated as the second surface.

Figure 1:
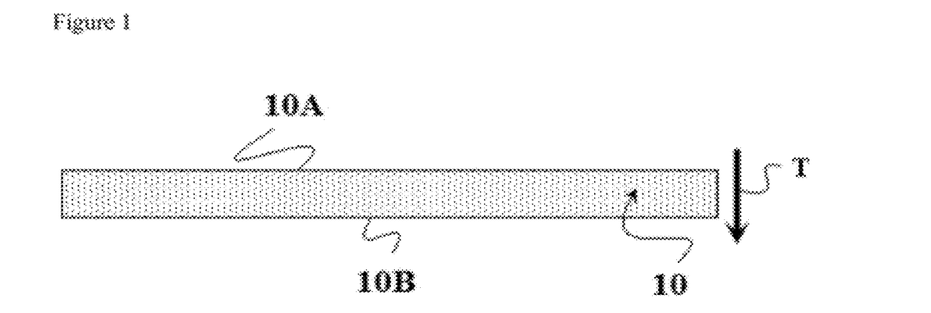
FIG. 1 is a sectional view illustratively representing the pressure sensitive adhesive according to the present invention.

FIG. 1 is a drawing representing a cross-section of an illustrative pressure sensitive adhesive (10) according to the present invention. As in FIG. 1, when the present pressure sensitive adhesive is formed in a single layer, it may have a first surface (10A) and a second surface (10B), wherein said first and second surfaces (10A, 10B) are designed to have different peel forces from each other.

For example, said first surface herein may have a peel force lower than the second surface. In addition, said first surface may have a peel force to an alkali-free glass of 5 gf/25 mm to 100 gf/25 mm, preferably 5 gf/25 mm to 50 gf/25 mm, and more preferably 10 gf/25 mm to 50 gf/25 mm. Also, said second surface may have a peel force to an alkali-free glass of 100 gf/25 mm to 1,000 gf/25 mm, preferably 200 gf/25 mm to 800 gf/25 mm, and more preferably 200 gf/25 mm to 750 gf/25 mm. The above peel force is a peel force measured by a method specified in the following examples. For example, when the pressure sensitive adhesive is applied to an optical element such as a polarizing plate, it can be designed to show excellent wettability to an adherend such as a liquid crystal panel, with effectively inhibiting shrinkage and expansion phenomenon of a functional film such as a polarizer under high temperature or high humidity condition, by controlling each peel force of the first and second surfaces in the aforementioned range.

To obtain a single layered pressure sensitive adhesive of which both sides have different peel forces as above, for example, a process for preparing a pressure sensitive adhesive using the aforementioned pressure sensitive adhesive composition according to the present invention by a manner described below may be used. That is, in a hardening procedure for preparing a sheet shape pressure sensitive adhesive layer, the above pressure sensitive adhesive can be formed by forming a gradient by which the modulus is changed along a thickness direction of said sheet shape. With reference to FIG. 1, said pressure sensitive adhesive layer, in one aspect, may have a gradient of a tensile modulus formed along a thickness direction of the sheet shape (an arrow (T) direction in FIG. 1) from the first surface (10A) to the second surface (10B). The change of the tensile modulus along the thickness direction means that the tensile modulus in the sheet shape pressure sensitive adhesive continuously or intermittently increases or decreases along the thickness direction. Specifically, the tensile modulus herein may be changed along the thickness direction such that the first surface represents the highest tensile modulus and the second surface represents the lowest tensile modulus.

When the tensile modulus is controlled to differ along the thickness direction as above, an average tensile modulus of said pressure sensitive adhesive at 25° C. may be in a range of 0.1 to 500 MPa, preferably 10 to 400 MPa, and more preferably 45 to 300 Mpa. When the pressure sensitive adhesive is applied to an optical element, it can be allowed to effectively inhibit light leakage phenomena, and the like, and show excellent durability under high temperature or high humidity conditions, by controlling an average value of tensile modulus in the above range. Meanwhile, said tensile modulus is measured by a method described in the following examples.

A thickness of said pressure sensitive adhesive herein is not particularly limited, and for example, may be suitably selected, considering uses to which the pressure sensitive adhesive is applied and probability that the pressure sensitive adhesive, wherein modulus is changed along the thickness direction, can be embodied.

The present invention also relates to a process for preparing a pressure sensitive adhesive layer comprising steps of coating a pressure sensitive adhesive composition comprising an acrylic polymer with an alkyleneoxide group and an ultraviolet absorber in a sheet shape, wherein the composition in a hardened state comprises an interpenetrating polymer network structure comprising said acrylic polymer in a crosslinked state, irradiating one side of said sheet shape with ultraviolet and hardening the coating layer to prepare a pressure sensitive adhesive layer, wherein said irradiated ultraviolet proceeds along the thickness direction of the coating layer and is absorbed in said coating layer, whereby the process comprises a step of forming a gradient of tensile modulus along the thickness direction of said hardened pressure sensitive adhesive layer.

That is, said pressure sensitive adhesive may be prepared by coating the above pressure sensitive adhesive composition or a coating liquid prepared using the same to a suitable substrate via usual means such as a bar coater or a comma coater and hardening it.

In this case, said composition comprises an ultraviolet absorber, whereby the irradiated ultraviolet is absorbed in a procedure of proceeding to the thickness direction of the coating layer and thus a gradient of modulus may be formed.

Figure 2:
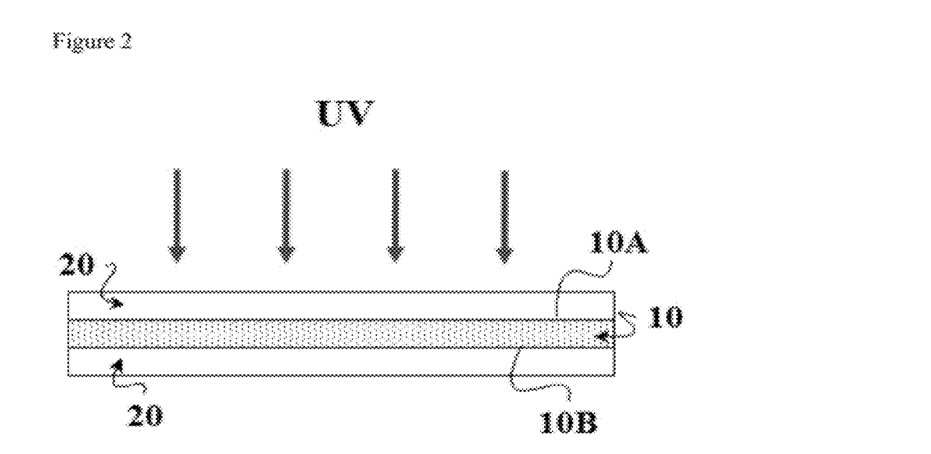
FIG. 2 is a drawing illustratively representing a procedure of forming the pressure sensitive adhesive according to the present invention.

FIG. 2 is a drawing schematically representing a process for preparing one illustrative pressure sensitive adhesive according to the present invention, wherein the pressure sensitive adhesive may be formed by irradiating a coating layer (10) of said pressure sensitive adhesive composition with ultraviolet as in FIG. 2. Here, following forming a coating layer (10) of said pressure sensitive adhesive composition between two sheets of releasing films (20), the ultraviolet irradiation may be carried out on one side of said coating layer (10). At this time, the pressure sensitive adhesive composition comprises an ultraviolet absorber, whereby the irradiated ultraviolet is absorbed at a certain ratio while proceeding along the thickness direction of the coating layer (10). Therefore, the surface (10A) directly irradiated with ultraviolet shows high modulus and low peel force, as hardening sufficiently proceeds, while the opposite surface (10B) shows low modulus and high peel force, since the degree of hardening relatively decreases.

The desired aspect of pressure sensitive adhesive may be effectively embodied by using the pressure sensitive adhesive composition according to the present invention as above and, optionally, regulating kinds or contents of the ultraviolet absorber included in said composition, the thickness of the coating layer (10, in FIG. 2), or wavelength or intensity of the irradiated ultraviolet, and the like.

In addition, said ultraviolet irradiation may be carried out using known means such as, for example, a high pressure mercury lamp, an electrodeless lamp or a xenon lamp. Also, conditions of the ultraviolet irradiation are not particularly limited, and may be suitably selected, considering the compositions of the pressure sensitive adhesive, whereby hardened materials where the tensile modulus differs along the thickness direction may be effectively prepared. In addition, in this case, illuminance may be about 50 to 1,000 mW/cm$^2$ and amount of light may be about 50 to 1,000 mJ/cm$^2$, but is not limited thereto.

In addition, in said process for preparation herein, a process such as heating, drying or aging may be also carried out in addition to said ultraviolet irradiation process, for hardening efficiency of the pressure sensitive adhesive composition or formation of the IPN structure, and the like.

The pressure sensitive adhesive as above has a gel content, as represented by the following general formula 1, of preferably at least 80% by weight and more preferably at least 90% by weight, in a state embodied with the IPN.

Gel content (% by weight)=$B/A \times 100$     [General Formula 1]

wherein, A represents a mass of the pressure sensitive adhesive embodied with the IPN structure, B represents a dry mass of insoluble fractions obtained in the same pressure sensitive adhesive as above after depositing it in ethyl acetate at room temperature for 48 hours.

If said gel content is less than 80% by weight, it is apprehended that durability of the pressure sensitive adhesive will be lowered under high temperature and/or high humidity conditions.

The upper limit of said gel content herein is not particularly limited, and may be appropriately controlled, for example, in a range of up to 99%, considering stress relaxation characteristic, and the like of the pressure sensitive adhesive.

The present invention also relates to a polarizing plate comprising a polarizer; and said pressure sensitive adhesive formed on one side of said polarizer, and in one aspect, a surface having relatively low peel force in a first surface and a second surface in said pressure sensitive adhesive layer is disposed at a side of said polarizer, and a surface having relatively high peel force may be a pressure sensitive adhesive surface for attaching said polarizer to a liquid crystal panel.

The polarizer included in the polarizing plate is not particularly limited to any kind. For example, a general polarizer known in this field such as polyvinyl alcohol-based polarizer may be used.

In addition, the polarizing plate may further comprise a protective film formed on one or both sides of said polarizer.

That is, the present polarizing plate may have, for example, the structure where protective films are formed on both sides of said polarizer, wherein the pressure sensitive adhesive according to the present invention is attached to one protective film thereof. The present polarizing plate (3) may also have, optionally, the structure where a protective film is formed on only one side of the polarizer and the pressure sensitive adhesive according to the present invention is directly formed on the other side. Such a structure where one protective film thereof is omitted can be called a thin polarizing plate.

In any case, it is preferred that the side having relatively low peel force for the pressure sensitive adhesive be disposed on the side of the polarizer. By attaching the side having low peel force to glass as above, to the polarizer, a phenomenon where the polarizer shrinks or expands under high temperature or humidity conditions may be prohibited, even when the protective film is not attached to one side of the polarizer. In addition, when the side having high peel force is formed on the opposite side of the polarizer and the polarizing plate is applied to a liquid crystal display device, and the like, it can be allowed to show excellent durability.

The protective film, which can be included in the polarizing plate herein, is not particularly limited to any kind. For example, one or at least two of cellulose films such as triacetyl cellulose; polyester films such as polycarbonate films or polyethyleneterephthalate films; polyethersulfone films; polyolefin films such as polyethylene films, polypropylene films, or polyolefin films having a cyclo or norbornene structure or polyolefin films such as ethylene propylene copolymer; and/or acryl films, and the like may be used as said protective film. Here, a thickness of said protective film is also not particularly limited and it may be formed to have a usual thickness.

Also, the present polarizing plate may further comprise at least one functional layer such as a waterproof layer, a protective layer, a reflective layer, an antiglare layer, a retardation plate, a wide view angle compensation film or a brightness enhancing film. In one aspect, when the protective film in the present polarizing plate is omitted and the pressure sensitive adhesive layer is directly attached to the polarizer, an adhesive layer may be further formed between said polarizer and the pressure sensitive adhesive. Here, an example of the usable adhesive may include water-based polyvinyl alcohol adhesives, solvent-free acrylic adhesives or solvent-free vinyl acetate adhesives, and the like, but is not limited thereto.

A method of manufacturing the polarizing plate as above by applying the aforementioned pressure sensitive adhesive thereto herein is not particularly limited, and all the known means in this field may be adapted.

In addition, the present invention relates to a liquid crystal display device comprising a liquid crystal panel and a polarizing plate according to the present invention attached to one or both sides of said liquid crystal panel.

The liquid crystal panel included in the present liquid crystal display device as above is not particularly limited to any kind. For example, all the known liquid crystal panels herein, including various passive matrix types including TN (Twisted Nematic) type, STN (Super Twisted Nematic) type, F (ferroelectric) type and PD (polymer dispersed LCD) type, and the like; various active matrix types including two terminal type and three terminal type; In-plane switching (IPS) mode panels and vertical alignment (VA) mode panels, may be applied thereto, without being limited to any kind. In addition, other components included in the liquid crystal display device of the present invention are not particularly limited to any kind, and the method of preparing the same is also not particularly limited. General constitutions in this field may be selected and used without limitation.

Advantageous Effects

The present invention may effectively provide a pressure sensitive adhesive where peel forces for both sides are different and an modulus is changed along the thickness direction. By applying the pressure sensitive adhesive as above, the present invention may provide, for example, an optical element, such as a polarizing plate, which can effectively inhibit light leakage and shows excellent durability, while being formed to have a thin thickness as well.

MODE FOR INVENTION

The present invention is explained in more detail through examples according to the present invention and comparative examples not according to the present invention below, but the scope of the present invention is not restricted by the following examples.

Preparation Example 1

Preparation of Acrylic Polymer

In a 1 L reactor with nitrogen gas refluxed and an installed refrigerator to easily regulate a temperature, 79 parts by weight of n-butyl acrylate (n-BA), 20 parts by weight of methoxy ethyleneglycol acrylate (MEA) and 1.0 part by weight of 2-hydroxyethyl acrylate (2-HEA) were poured. Subsequently, 120 parts by weight of ethyl acetate (EAc) as a solvent was poured therein, and nitrogen gas was purged for 60 minutes to remove oxygen. Then, in a state where the temperature was maintained at 60° C., 0.03 parts by weight of a reaction initiator, azobisisobutyronitrile (AIBN) was poured therein, and reacted for 8 hours. Following the reaction, the reactant was diluted with ethyl acetate (EAc) to prepare an acrylic polymer having a solid content concentration of 15% by weight, a weight average molecular weight of 1,800,000 and a molecular weight distribution of 4.5.

Preparation Examples 2 to 8

Preparation of Acrylic Polymers (B to H)

The acrylic polymers were prepared by the same method as Preparation Example 1 except that compositions of monomers were changed as represented in the following Table 1 (In Table 1 below, the acrylic polymer (A) is the same as the polymer prepared in Preparation Example 1).

TABLE 1

| | Copolymers | | | | | | | |
|---|---|---|---|---|---|---|---|---|
| | A | B | C | D | E | F | G | H |
| n-BA | 79 | 94 | 79 | 79 | 94 | 98.7 | 99 | 95 |
| MEA | 20 | — | — | — | — | — | — | — |
| EEA | — | 15 | 30 | — | — | — | — | — |
| PEA | — | — | — | 25 | — | — | — | — |
| LA | — | — | — | — | 5 | — | — | — |
| 2-HEA | 1 | 1 | 1 | 1 | 1 | 1 | 1 | — |
| AA | — | 0.5 | — | — | — | 0.3 | — | 5 |
| $M_w$(10,000) | 180 | 175 | 165 | 150 | 175 | 175 | 170 | 170 |
| PDI | 4.5 | 5.2 | 5.1 | 4.7 | 5.2 | 3.8 | 3.9 | 3.7 |

Content Unit: Part by weight
n-BA: n-butyl acrylate
MEA: methoxy ethyleneglycol acrylate
EEA: ethoxy diethyleneglycol acrylate
PEA: phenoxy ethyleneglycol acrylate
LA: lauryl acrylate
2-HEA: 2-hydroxyethyl acrylate
AA: acrylic acid
Mw: weight average molecular weight
PDI: molecular weight distribution Example 1

Preparation of Pressure Sensitive Adhesive Layer 100 parts by weight of an acrylic polymer (A), 3 parts by weight of a multifunctional crosslinker (TDI-based isocyanate, Coronate L, manufactured by Nippon Polyurethane Company (JP)), 100 parts by weight of a multifunctional acrylate (trifunctional urethane acrylate, Aronix M-315, supplied by Dong Woo Corp.), 2 parts by weight of a photoinitiator, hydroxycyclohexyl phenyl ketone, (Irg 184, manufactured by Ciba Specialty Chemical Co. (CH)), 2 parts by weight of a triazine-based ultraviolet absorber (Tinuvin 400, manufactured by Ciba Specialty Chemical Co. (CH)) and 0.2 parts by weight of a silane coupling agent having β-cyanoacetyl group (M812, manufactured by LG Chem. Ltd. (KR)) were formulated in a solvent, such that a solid content concentration is 30% by weight, to prepare the pressure sensitive adhesive composition. Then, the prepared pressure sensitive adhesive composition was coated on the release treated side of the release treated PET (poly(ethyleneterephthalate)) film (thickness: 38 μm, MRF-38, manufactured by Mitsubishi) to have a thickness of 25 μm after drying, and dried in an oven at 110 for 3 minutes. Then, the release treated side of the release treated PET film (thickness: 38 μm, MRF-38, manufactured by Mitsubishi) was further laminated on the dried coating layer as above to prepare a laminate having a structure represented in FIG. 2, and irradiated with ultraviolet (illuminance: 250 mW/cm$^2$, light amount: 300 mJ/cm$^2$), using a high pressure mercury lamp, to form a pressure sensitive adhesive layer (10) between two sheets of the release PET films (20). Hereinafter, for convenience of description, among the pressure sensitive adhesive layer (10), the surface of the side irradiated with ultraviolet is referred to the first surface (10A) and the opposite surface referred to the second surface (10B).

Preparation of Polarizing Plate

A polyvinyl alcohol-based resin film was stretched, died with iodine and treated with an aqueous solution of boric acid to prepare a polarizer. Subsequently, a TAC (triacetyl cellulose) film having a thickness of 60 μm was attached to one side of the polarizer with a water-based polyvinyl alcohol adhesive which is usually used to attach a protective film to a polarizer. Then, using the same water-based polyvinyl alcohol adhesive as above, the first surface of the above prepared pressure sensitive adhesive layer was laminated on the side of the above polyvinyl alcohol polarizer to which the TAC film was not attached to prepare a polarizing plate.

Examples 2 to 7 and Comparative Examples 1 to 5

Preparation of Pressure Sensitive Adhesive Composition

Pressure sensitive adhesive compositions were prepared by the same method as Example 1, except that compositions were changed as represented in the following Tables 2 and 3.

TABLE 2

| | Examples | | | | | | |
|---|---|---|---|---|---|---|---|
| | 1 | 2 | 3 | 4 | 5 | 6 | 7 |
| (A) | 100 | — | — | — | 100 | 100 | 100 |
| Polymer (B) | — | 100 | — | — | — | — | — |
| Polymer (C) | — | — | 100 | — | — | — | — |
| Polymer (D) | — | — | — | 100 | — | — | — |
| MFA1 | 100 | 100 | 100 | 100 | — | 20 | — |
| MFA2 | — | — | — | — | 80 | 80 | 80 |
| Crosslinker | 3.0 | 3.0 | 3.0 | 3.0 | 3.0 | 3.0 | 3.0 |
| Irg184 | 2.0 | 2.0 | 2.0 | 2.0 | 3.0 | 3.0 | 3.0 |
| UVA | 2.0 | 2.0 | 2.0 | 2.0 | 2.0 | 3.0 | 3.0 |
| M812 | 0.2 | 0.2 | 0.2 | 0.2 | 0.2 | 0.2 | 0.2 |
| T-789J | — | 0.4 | — | — | — | — | — |

Content Unit: part by weight
MFA1: trifunctional urethane acrylate (Aronix M-315, supplied by Dong Woo Corp.)
MFA2: hexafunctional urethane acrylate (UA 306I, manufactured by Kyoeisha Company)
Crosslinker: TDI-based isocyanate, Coronate L, manufactured by Nippon Polyurethane Company (JP))
Irg184: hydroxy cyclohexylphenyl ketone (Ciba Specialty Chemical (CH))
UVA: triazine ultraviolet absorber (Tinuvin 400, Ciba Specialty Chemical (CH))
M812: silane coupling agent containing β-cyanoacetyl group (LG Chem. Ltd. (KR))
T-789J: silane coupling agent containing acetoacetate group (Soken (JP))

TABLE 3

| | Comparative Examples | | | | |
|---|---|---|---|---|---|
| | 1 | 2 | 3 | 4 | 5 |
| Polymer (A) | — | — | — | — | 100 |
| Polymer (E) | 100 | — | — | — | — |
| Polymer (F) | — | 100 | — | — | — |
| Polymer (G) | — | — | 100 | — | — |
| Polymer (H) | — | — | — | 100 | — |
| MFA1 | — | 20 | — | — | — |
| MFA2 | 80 | 80 | 80 | 80 | — |
| Crosslinker | 3.0 | 3.0 | 3.0 | 3.0 | 3.0 |
| Irg184 | 2.0 | 2.0 | 2.0 | 2.0 | — |
| UVA | 2.0 | 2.0 | 2.0 | 2.0 | 2.0 |
| M812 | — | — | — | — | — |
| T-789J | 0.2 | 0.2– | 0.2– | 0.2– | 0.2– |

Content Unit: part by weight
MFA1: trifunctional urethane acrylate (Aronix M-315, supplied by Dong Woo Corp.)
MFA2: hexafunctional urethane acrylate (UA 306I, manufactured by Kyoeisha Company)
Crosslinker: TDI-based isocyanate, Coronate L, manufactured by Nippon Polyurethane Company (JP))
Irg184: hydroxy cyclohexylphenyl ketone (Ciba Specialty Chemical (CH))
UVA: triazine ultraviolet absorber (Tinuvin 400, Ciba Specialty Chemical (CH))
M812: silane coupling agent containing β-cyanoacetyl group (LG Chem. Ltd. (KR))
T-789J: silane coupling agent containing acetoacetate group (Soken (JP))

<Physical Property Evaluation>
1. Evaluation of Tensile Modulus

The tensile modulus of the pressure sensitive adhesive layer herein is measured via a test method of stress-strain by tensile according to a method defined in ASTM D638, or found by measuring storage modulus and converting it through the following conversion formula, when difficult to directly measure the tensile modulus. Specifically, laminates having a structure represented in FIG. 2 (laminated structures of a release PET film, a pressure sensitive adhesive layer and a release PET film) as those prepared in Examples or Comparative Examples are tailored into a dog bone type specimen having a size of 7 cm long and 1 cm wide. Both ends of the specimen are fixed with a jig for testing tensile, followed by measuring the tensile modulus. Conditions for measuring tensile modulus are as follows.

<Condition for Measuring Tensile Modulus>
Measuring instrument: UTM (Universal Testing Machine)
Equipment model: Zwick Roell Z010, manufactured by Instron Company
Measuring Conditions:
Load cell: 500 N
Tension rate: 3 mm/sec <Measurement of Storage Modulus and Conversion into Tensile Modulus>

Pressure sensitive adhesive layers are cut to a size of 15 cm×25 cm×25 μm (width×length×thickness) and the cut pressure sensitive adhesive layers are laminated to be 5-layered. Subsequently, the laminated pressure sensitive adhesive layer is cut into a circle having a diameter of 8 mm, and then, held in a state compressed using glass over night to improve wetting of each interlayer interface, whereby bubbles occurred during lamination are removed to prepare a sample. Subsequently, the sample is placed on a parallel plate, a gap is regulated, normal & torque are set to zero, stabilization of normal force is identified, and then, the storage modulus is measured according to the following conditions and the tensile modulus is found by the following conversion formula.

Measuring Instrument and Conditions
Measuring instrument: ARES-RDA, TA Instruments Inc. with forced convection oven
Measuring Conditions:
Geometry: 8 mm parallel plate
Gap: around 1 mm
Test type: dynamic strain frequency sweep
Strain=10.0 [%], temperature: 30° C.
Initial frequency: 0.4 rad/s, final frequency: 100 rad/s $$E = 3G \qquad \text{<Conversion Formula>}$$

wherein, E represents a tensile modulus, and G represents a storage modulus.

2. Evaluation of Peel Force and Repeelable Characteristic

Using a pressure sensitive adhesive layer prepared in Examples and Comparative Examples, a polarizing plate is prepared by the same as Example 1, wherein a direction of a pressure sensitive adhesive layer differs depending on the surface of the pressure sensitive adhesive layer for the peel force to be measured. That is, in processes for preparing the polarizing plate described in Example 1, when the peel force of the first surface is measured, the second surface is attached to the polarizer side, and when the peel force of the second surface is measured, the first surface is attached to the polarizer side. Then, the polarizing plate is cut to a size of 25 mm×100 mm (width×length) to prepare a specimen. Subsequently, the attached release PET film on the pressure sensitive adhesive layer is peeled off, and the surface of the pressure sensitive adhesive layer is attached to an alkali-free glass using a 2 Kg roller according to JIS Z 0237 standard. Then, the alkali-free glass to which the pressure sensitive adhesive layer is attached is pressed in an autoclave (50° C., 0.5 atm) for about 20 minutes, and stored in a constant temperature and humidity (23° C., 50% RH) for 25 hours. Then, the above polarizing plate is peeled off from the alkali-free glass at a peel rate of 300 mm/min and a peel angle of 180° using a TA equipment (Texture analyzer, manufactured by Stable Micro Systems Ltd. (UK)) to measure peel force. Also, repeelable characteristic is evaluated based on the following criteria.

<Evaluation Criteria of Repeelable Characteristic>

◯: 1 day after attaching, the measured peel force being 800 N/25 mm or less

Δ: 1 day after attaching, the measured peel force being 1,000 N/25 mm or more x: 1 day after attaching, the measured peel force being 2,000 N/25 mm or more 3. Evaluation of Durability A polarizing plate prepared in Examples and Comparative Examples was cut to a size of 90 mm×170 mm (width×length) to prepare a specimen of two sheets per each Example and Comparative Example. Subsequently, two sheets of the prepared specimen were attached to both sides of a glass substrate (110 mm×190 mm×0.7 mm=width×length×height), with the optical absorbing axes of each polarizing plate crossed, to prepare a sample. The pressure applied on attaching was about 5 Kg/cm$^2$ and this work was carried out in a clean room, such that bubbles or foreign materials were not introduced to interfaces. Then, moisture-heat resistant durability was evaluated by observing whether or not bubbles or peel-off occurred in the pressure sensitive adhesive interfaces after leaving the sample at a temperature of 60° C. and a relative humidity of 90% RH for 1,000 hours, and heat resistant durability was evaluated by observing whether or not bubbles or peel-off occurred in the pressure sensitive adhesive interfaces after leaving the sample at a temperature of 80° C. for 1,000 hours. The sample prepared immediately before measuring moisture-heat resistant or heat resistant durability was left at room temperature for 24 hours, and evaluated. The evaluation criteria are as follows.

<Evaluation Criteria of Durability>

◯: No bubble and peel-off

Δ: A few bubbles and/or peel-off x: Many bubbles and/or peel-off

4. Evaluation of Water Resistance

A polarizing plate prepared in Examples and Comparative Examples was cut to a size of 90 mm×170 mm (width×length), and the cut specimen was attached to one side of a glass substrate (110 mm×190 mm×0.7 mm=width×length×thickness) to prepare a sample. The pressure applied on attaching was about 5 Kg/cm$^2$ and this work was carried out in a clean room, such that bubbles or foreign materials were not introduced to interfaces. Subsequently, the prepared sample was introduced into water at a temperature of 60° C. and taken out after leaving it for 24 hours, and then, water resistance was evaluated under the following criteria by observing whether bubbles or peel-off occurred.

<Evaluation Criteria of Water Resistance>

◯: No bubble and peel-off

Δ: A few bubbles and/or peel-off x: Many bubbles and/or peel-off

5. Evaluation of Haze

Using a pressure sensitive adhesive composition in Examples or Comparative Examples, a sample (thickness of pressure sensitive adhesive layer: 23 μm) having a structure as shown in FIG. 2 was prepared, and the haze of the pressure sensitive adhesive layer in the sample was measured according to JIS K 7105-1 standard using a hazemeter (HR-100, manufactured by Murakami Color Research Laboratory Co., Ltd. (JP)).

6. Evaluation of Light Transmission Uniformity

A polarizing plate prepared in Examples and Comparative Examples was attached to both sides of a 22 inch LCD monitor (manufactured by LG Philips LCD) at a state where optical axes crossed each other, stored under a constant temperature and humidity (23° C., 50% relative humidity) for 24 hours, and left at a temperature of 80° C. for 200 hours. Then, the light transmission uniformity was evaluated based on the following criteria, while irradiating the above monitor with light using back light in a dark room.

<Evaluation Criteria of Light Transmission Uniformity>

⊙: Non-uniformity phenomenon of light transmission in four fringes of the monitor was not determined by the naked eye.

◯: Non-uniformity phenomenon of light transmission in four fringes of the monitor was slightly observed.

Δ: Some non-uniformity phenomenon of light transmission in four fringes of the monitor was observed.

x: A large quantity of non-uniformity phenomenon of light transmission in four fringes of the monitor was observed.

7. Evaluation of Weight Average Molecular Weight and Molecular Weight Distribution The weight average molecular weight and the molecular weight distribution of the acrylic polymer were measured under the following conditions using GPC. In preparing calibration curves, the measuring results were converted, using standard polystyrene in Agilent system.

<Conditions for Measuring Weight Average Molecular Weight>

Measuring Instrument Agilent GPC (Agilent 1200 series, USA)

Column: linked two PL Mixed B

Column temperature: 40° C.

Eluent: Tetrahydrofuran

Flow rate: 1.0 mL/min

Concentration: ~2 mg/mL (100 μL injection)

The above measuring results were summarized and described in Tables 4 and 5 below.

TABLE 4

| | Examples | | | | | | |
|---|---|---|---|---|---|---|---|
| | 1 | 2 | 3 | 4 | 5 | 6 | 7 |
| Tensile modulus (25° C., MPa) | 95 | 65 | 130 | 175 | 207 | 250 | 215 |

TABLE 4-continued

| | Examples | | | | | | |
|---|---|---|---|---|---|---|---|
| | 1 | 2 | 3 | 4 | 5 | 6 | 7 |
| Peel force of the first surface (gf/25 mm) | 25 | 35 | 20 | 18 | 14 | 15 | 25 |
| Peel force of the second surface (gf/25 mm) | 500 | 650 | 400 | 350 | 335 | 265 | 520 |
| Repeelable characteristic | ○ | ○ | ○ | ○ | ○ | ○ | ○ |
| Heat resistant durability | ○ | ○ | ○ | ○ | ○ | ○ | ○ |
| Moisture-heat resistant durability | ○ | ○ | ○ | ○ | ○ | ○ | ○ |
| Water resistance | ○ | ○ | ◎ | ○ | ○ | ○ | ○ |
| Haze (%) | 7.2 | 8.4 | 6.5 | 6.8 | 5.2 | 5.3 | 5.9 |
| Light transmission uniformity | ◎ | ○ | ◎ | ◎ | ○ | ◎ | ○ |

TABLE 5

| | Comparative Examples | | | | |
|---|---|---|---|---|---|
| | 1 | 2 | 3 | 4 | 5 |
| Tensile modulus (25° C., MPa) | 25 | 9 | 13 | 8 | 0.04 |
| Peel force of the first surface (gf/25 mm) | 130 | 120 | 105 | 200 | 500 |
| Peel force of the second surface (gf/25 mm) | 670 | 850 | 745 | 750 | 850 |
| Repeelable characteristic | ○ | Δ | ○ | Δ | Δ |
| Heat resistant durability | X | X | X | X | X |
| Moisture-heat resistant durability | X | Δ | Δ | X | X |
| Water resistance | X | X | Δ | X | X |
| Haze (%) | 12.3 | 15.0 | 13.5 | 13.9 | 6.4 |
| Light transmission uniformity | X | X | X | X | ○ |

As can be seen from the above results, the pressure sensitive adhesive layers in Examples 1 to 7 showed excellent physical properties even when applied to the polarizer, one side of which no protective film was formed on.

However, if the acrylic polymer forming the IPN structure does not comprise a compound of chemical formula 1 or the IPN structure, it can be identified that at least one physical property of those required of pressure sensitive adhesives for polarizing plates is highly lowered.

REFERENCE SIGNS LIST

10: a pressure sensitive adhesive layer
10A: a first surface
10B: a second surface
20: a release PET film

The invention claimed is:

1. A pressure sensitive adhesive composition comprising: an acrylic polymer with an alkyleneoxide group, and an ultraviolet absorber,
wherein the composition in a hardened state has an average tensile modulus at 25° C. ranging from 10 to 400 MPa,
wherein the composition comprises an interpenetrating polymer network structure having said acrylic polymer in a cross-linked state, the interpenetrating polymer network further comprising a multifunctional acrylate in an amount of 80-100 parts by weight relative to 100 parts by weight of the acrylic polymer, and represents different peel forces in both sides of a single layer sheet shape having a first surface and second surface present opposite to the first surface on hardening the composition into the sheet shape, and
wherein the peel force of the first surface of the sheet shape to glass is from 5 gf/25 mm to 100 gf/25 mm and the peel force of the second surface of the sheet shape to glass is from 265 gf/25 mm to 625 gf/25 mm.

2. The pressure sensitive adhesive composition according to claim 1, wherein the acrylic polymer has a weight average molecular weight of 400,000 to 2,000,000.

3. The pressure sensitive adhesive composition according to claim 1, wherein the acrylic polymer comprises a (meth) acrylic acid ester monomer; a monomer of chemical formula 1 and a crosslinkable monomer as a polymerized unit:

[Chemical Formula 1]

wherein, R represents hydrogen or an alkyl group, A represents alkylene, $R_1$ represents an alkyl group or an aryl group, and n represents a number of 1 to 50.

4. The pressure sensitive adhesive composition according to claim 3, wherein the monomer of chemical formula 1 is an alkoxy alkyleneglycol(meth)acrylic acid ester, alkoxy dialkyleneglycol(meth)acrylic acid ester, alkoxy trialkyleneglycol (meth)acrylic acid ester, alkoxy tetraalkyleneglycol(meth) acrylic acid ester, alkoxy polyethyleneglycol (meth)acrylic acid ester, a phenoxy alkyleneglycol(meth)acrylic acid ester, phenoxy dialkyleneglycol(meth)acrylic acid ester, phenoxy trialkyleneglycol(meth)acrylic acid ester, phenoxy tetraalkyleneglycol(meth)acrylic acid ester or phenoxy polyalkyleneglycol (meth)acrylic acid ester.

5. The pressure sensitive adhesive composition according to claim 1, wherein the acrylic polymer in a state cross-linked by a multi-functional crosslinker is included in the interpenetrating polymer network structure.

6. The pressure sensitive adhesive composition according to claim 1, wherein the ultraviolet absorber is a benzotriazole compound, a benzophenone compound, an oxalanilide compound, a benzoic acid ester compound or a triazine compound.

7. The pressure sensitive adhesive composition according to claim 1, further comprising a silane coupling agent having an acetoacetate group or a β-cyanoacetyl group.

8. The pressure sensitive adhesive composition according to claim 1, wherein a gradient of tensile modulus is formed along the thickness direction of the sheet shape in a direction from the first surface to the second surface.

9. The pressure sensitive adhesive composition according to claim 1, wherein the composition in the hardened state has an average tensile modulus at 25° C. ranging from 65 to 400 MPa.

10. A polarizing plate comprising a polarizer; and a layer of a pressure sensitive adhesive which is formed by hardening the pressure sensitive adhesive composition according to claim 1 formed on one or both sides of said polarizer.

11. A liquid crystal display device comprising a liquid crystal panel; and a polarizing plate according to claim 10 attached to one or both sides of said liquid crystal panel.

* * * * *